:::

(12) United States Patent
Amagai et al.

(10) Patent No.: US 9,178,187 B2
(45) Date of Patent: Nov. 3, 2015

(54) THIN BATTERY

(75) Inventors: Ryuichi Amagai, Isehara (JP); Naoto Todoroki, Sagamihara (JP); Michinori Ikezoe, Ebina (JP); Toshiyuki Motohashi, Funabashi (JP); Tomio Nagashima, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 64 days.

(21) Appl. No.: 13/698,882

(22) PCT Filed: May 19, 2011

(86) PCT No.: PCT/JP2011/061507
§ 371 (c)(1),
(2), (4) Date: Nov. 19, 2012

(87) PCT Pub. No.: WO2011/152219
PCT Pub. Date: Dec. 8, 2011

(65) Prior Publication Data
US 2013/0065109 A1    Mar. 14, 2013

(30) Foreign Application Priority Data

May 31, 2010  (JP) .................................. 2010-124409
Nov. 18, 2010  (JP) .................................. 2010-258291
May 11, 2011  (JP) .................................. 2011-106435

(51) Int. Cl.
*H01M 2/10*   (2006.01)
*H01M 2/02*   (2006.01)

(52) U.S. Cl.
CPC .......... *H01M 2/0212* (2013.01); *H01M 2/0207* (2013.01); *H01M 2/0215* (2013.01); *H01M 2/021* (2013.01); *H01M 2/0277* (2013.01)

(58) Field of Classification Search
CPC . H01M 2/1241; H01M 2/0207; H01M 2/021; H01M 2/0215; H01M 2/08; H01M 2/02
See application file for complete search history.

(56) References Cited

U.S. PATENT DOCUMENTS 7,829,216 B2    11/2010  Han et al.
2003/0072998 A1*  4/2003  Fredriksson et al. ......... 429/210
(Continued)

FOREIGN PATENT DOCUMENTS

EP    1 936 717 A1    6/2008
JP    10-055792 A     2/1998
(Continued)

*Primary Examiner* — Ula C Ruddock
*Assistant Examiner* — Scott J Chmielecki
(74) *Attorney, Agent, or Firm* — Foley & Lardner LLP

(57) ABSTRACT

Within outer cover member 111 of laminated film including resin layer 111c, there is installed electricity generating element 112 thereby to constitute battery body 11, peripheral portion 113 of the outer cover member being sealed. Spacer 12 is provided which has fixing portion 121 by which the battery body is fixed to predetermined position, the spacer being arranged between outer peripheral portion of the battery body and outer peripheral portion of another battery body put on the battery body. In range H1 that includes an overlapped portion 14 between the outer peripheral portion and the spacer and is provided at least around the fixing portion of the outer peripheral portion, there is provided elastic resin portion 13 produced through insert molding of elastic resin. This thin battery exhibits satisfied stability in set condition against vibration of motor vehicle. This thin battery exhibits satisfied fixing stability against vehicle vibration.

18 Claims, 18 Drawing Sheets

(56) References Cited

U.S. PATENT DOCUMENTS

2006/0083985 A1* 4/2006 Dunham .................. 429/185
2007/0207377 A1   9/2007 Han et al.
2008/0138698 A1*  6/2008 Ogami et al. ............... 429/91
2009/0297936 A1  12/2009 Nemoto et al.
2011/0123844 A1*  5/2011 Bhardwaj et al. ............ 429/56
2013/0115491 A1*  5/2013 Bhardwaj et al. ............ 429/82
2014/0106190 A1*  4/2014 Bhardwaj et al. ............ 429/82

FOREIGN PATENT DOCUMENTS

| JP | 2006-196222 A | 7/2006 |
| JP | 2007-073510 A | 3/2007 |
| JP | 2007-087922 A | 4/2007 |
| JP | 2008-147045 A | 6/2008 |
| JP | 2008-269926 A | 11/2008 |
| WO | WO 2008/007767 A1 | 1/2008 |

* cited by examiner

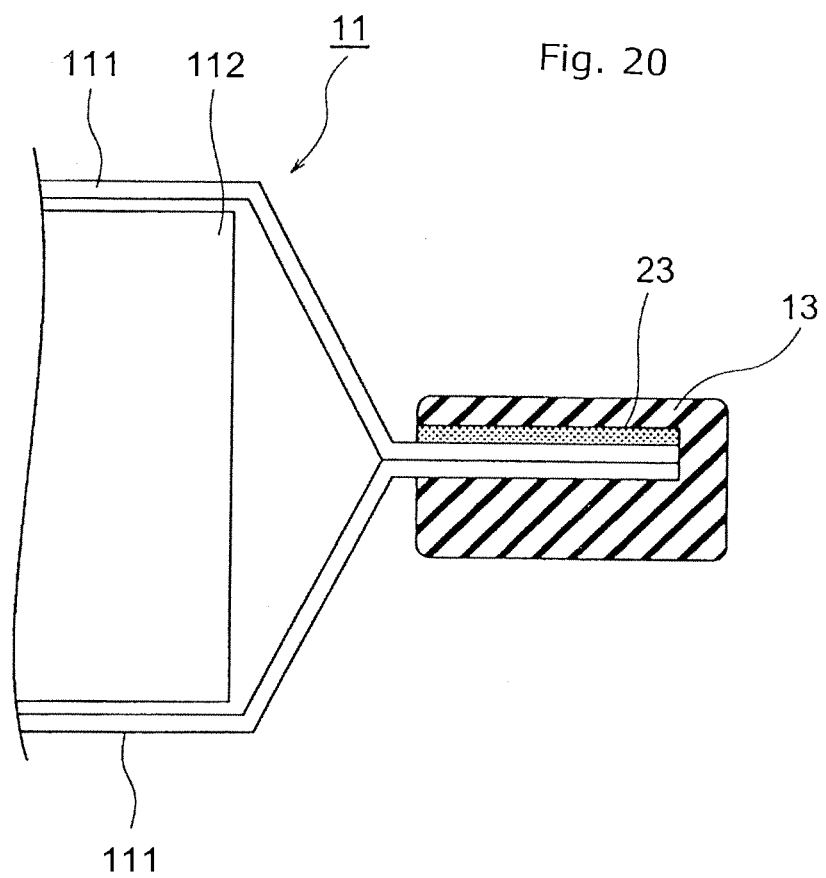

THIN BATTERY

TECHNICAL FIELD

The present invention relates to thin batteries.

BACKGROUND ART

In secondary batteries having an outer cover member of a laminated film, a type has been known in which plastic frame members are fixed to outer peripheral portions of the outer cover member to increase a mechanical strength of the outer cover member as well as a sealing strength of the outer cover member (Patent Document 1).

In the secondary battery of the above-mentioned type, a structure is employed in which an outer sealing part provided by the outer cover member is crammed into cramping grooves formed in the frame members to achieve coupling therebetween (see "resilient coupling" of paragraph 0041 of Patent Document 1). However, the structure fails to provide the secondary battery with a satisfied fixing or robustness against a vibration of a motor vehicle or the like, which is a problem.

PRIOR ART DOCUMENT

Patent Document

Patent Document 1: Japanese Laid-open Patent Application (Tokkai) 2007-73510

SUMMARY OF INVENTION

Therefore, an object of the present invention is to provide a thin battery that can exhibit a stable fixing against a vibration of a motor vehicle or the like.

According to the present invention, there is provided a thin battery which comprises a battery body that has an electricity generating element in an outer cover member of a laminated film including a resin layer, a spacer that is put between the battery body and another battery body put on the battery body for fixing the battery body to a predetermined position and an elastic body through which the battery body and the spacer are connected.

In the present invention, although external force, such as a force produced by vibration of the motor vehicle or the like, is led into the battery body through the elastic body, the elastic body is forced to generate a buffer power against the external force and thus fixing condition of the thin battery is made stable.

BRIEF DESCRIPTION OF DRAWINGS

FIG. 20 is a sectional view taken along the line XX-XX of FIG. 17.

EMBODIMENTS FOR EMBODYING THE INVENTION

First Embodiment

Figure 1:
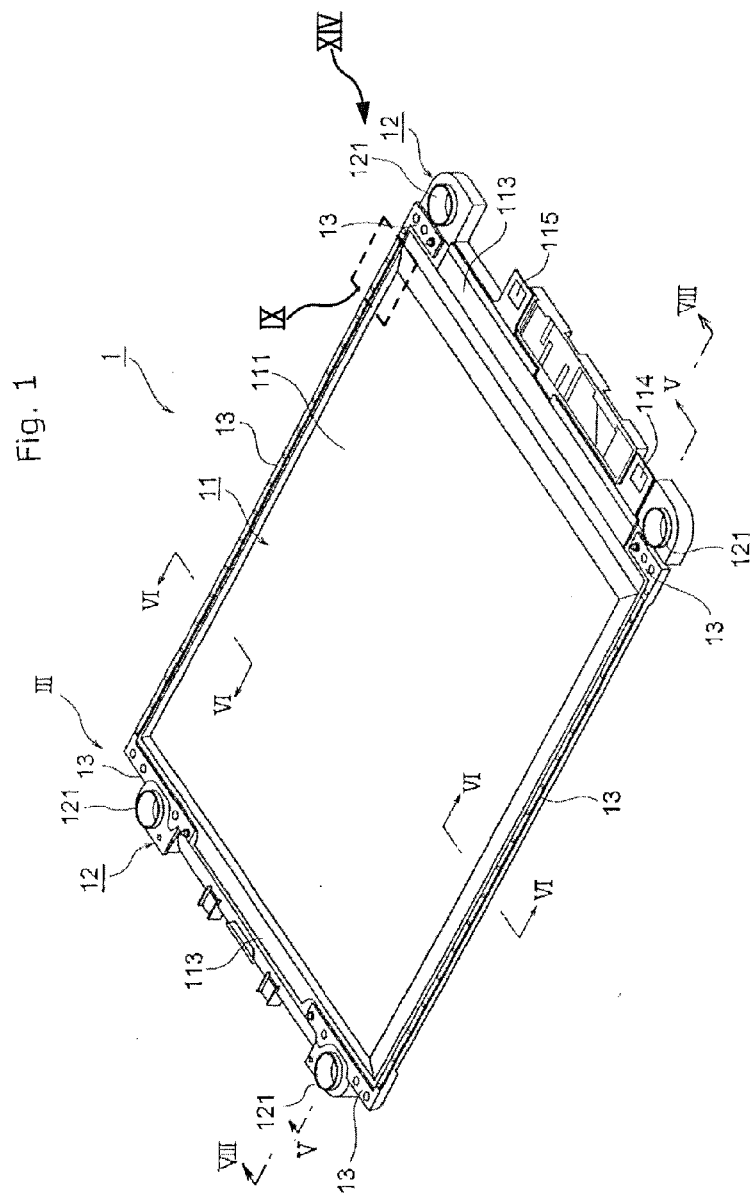
FIG. 1 is a perspective view of a secondary battery that is a first embodiment of the present invention.
Figure 2:
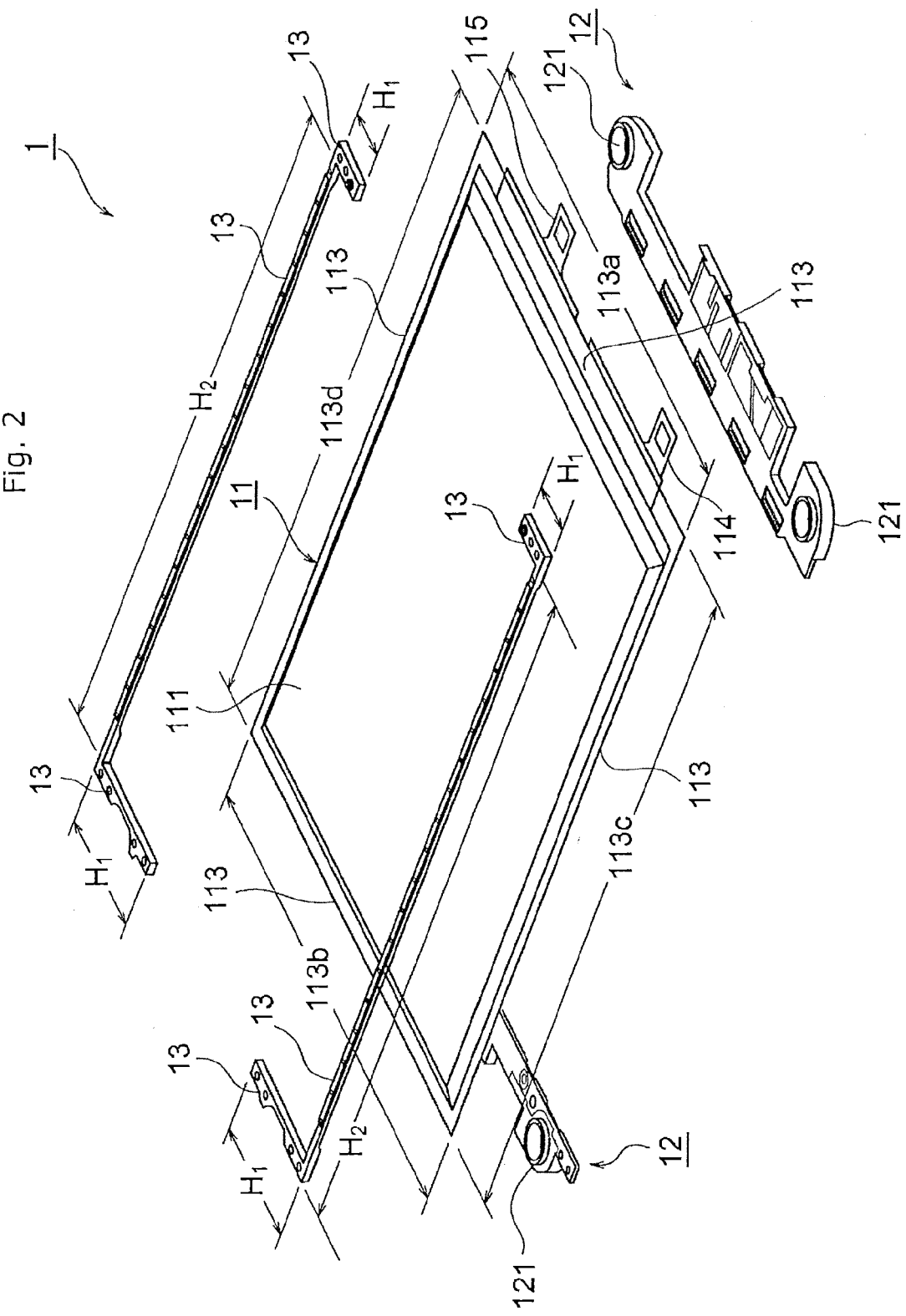
FIG. 2 is an exploded perspective view showing a main construction of the secondary battery of FIG. 1.
Figure 3:
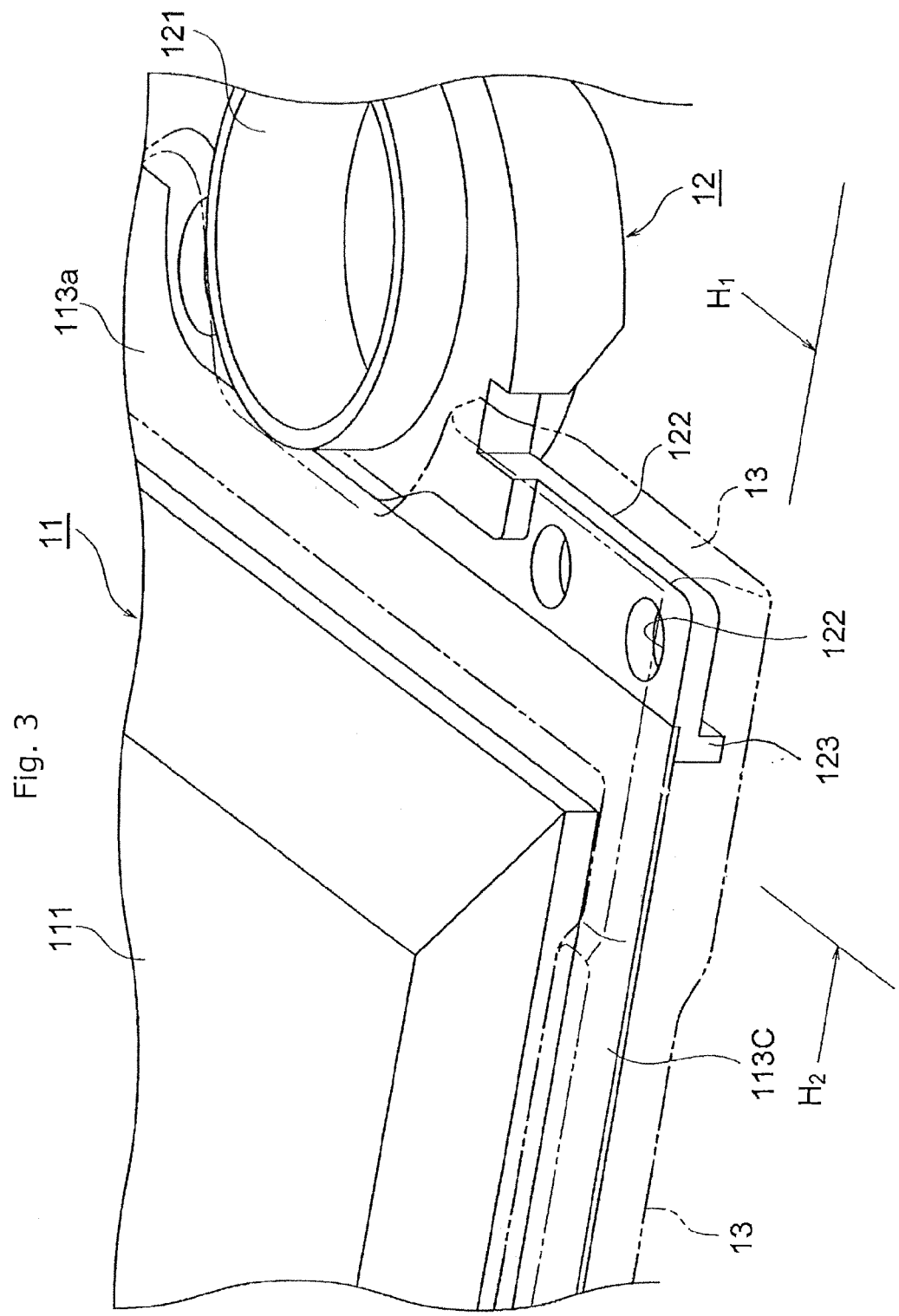
FIG. 3 is a view of a portion indicated by the arrow III of FIG. 1.

FIG. 1 is a perspective view of a secondary battery, in a completed condition, of a first embodiment of the present invention, and FIG. 2 is an exploded perspective view showing a condition wherein the secondary battery of the embodiment is exploded into major constructional elements. As is shown in FIGS. 1 and 2, the secondary battery 1 of the embodiment comprises a battery body 11 having a thin and flat shape, spacers 12 and elastic resin portions 13 that are shaped to enclose the battery body and the spacers.

Battery body 11 is a member that comprises an electricity generating element 112 installed in a pair of outer cover members 111 of laminated film, respective peripheral portions 113 of the pair of outer cover members 111 being sealed. In FIGS. 1 to 4, only one of outer cover members 111 is shown, and electricity generating element 112 is shown in FIG. 5. As is seen from the drawn out sectional view A of FIG. 5, the outer cover member 111 of laminated film has for example a three-layer structure including an inside resin layer 111a that is constructed of a resin film, such as a film of polyethylene, modified polyethylene, polypropylene, modified polypropylene or ionomer, etc., that exhibits excellent resistance to electrolyte and has excellent heat seal property, an intermediate metal layer 111b that is constructed of a metal foil, such as a foil of aluminum or the like, and an outside resin layer 111c that is constructed of a resin film, such as a film of polyamide resin, polyester resin or the like that has a high electric insulation, which layers are stacked in a direction from the inside toward the outside. Outside resin layer 111c corresponds to a resin layer according to the present invention.

As is mentioned hereinabove, each of the paired outer cover members 111 is constructed of a flexible material, such as a resin-metal thin film laminate material or the like that comprises intermediate metal layer 111b of which one surface (viz., inside surface of the secondary battery) is laminated with a film of polyethylene, modified polyethylene, polypropylene, modified polypropylene or ionomer, etc., and of which other surface (viz., outside surface of the secondary battery) is laminated with a film of polyamide resin or polyester resin.

Due to provision of intermediate metal layer 111b in addition to inside resin layer 111a and outside resin layer 111c, outer cover member 111 is able to increase the strength thereof. By constructing inside resin layer 111a by a resin of polyethylene, modified polyethylene, polypropylene, modified polypropylene or ionomer, etc., satisfied thermal adhesiveness is obtained between outer cover member 111 and each of metallic electrode terminals 114 and 115.

The construction of outer cover member 111 in the present invention is not limited to the above-mentioned three-layer structure. That is, either one of inside and outside resin layers 111a and 111c may have a single layer construction. Furthermore, a two-layer structure may be used which comprises one of inside and outside resin layers 111a and 111c and intermediate metal layer 111b, and furthermore, if it is needed, a four-layer or more layer structure may be used.

Each of the paired outer cover members 111 is shaped into a rectangular shallow bowl (viz., dish) to put therein electricity generating element 112. After putting electricity generating element 112 and an electrolyte thereinto, respective peripheral portions 113 of them are superposed on each other and these superposed peripheral portions 113 are entirely bonded by a heat seal or an adhesive material.

Figure 8:
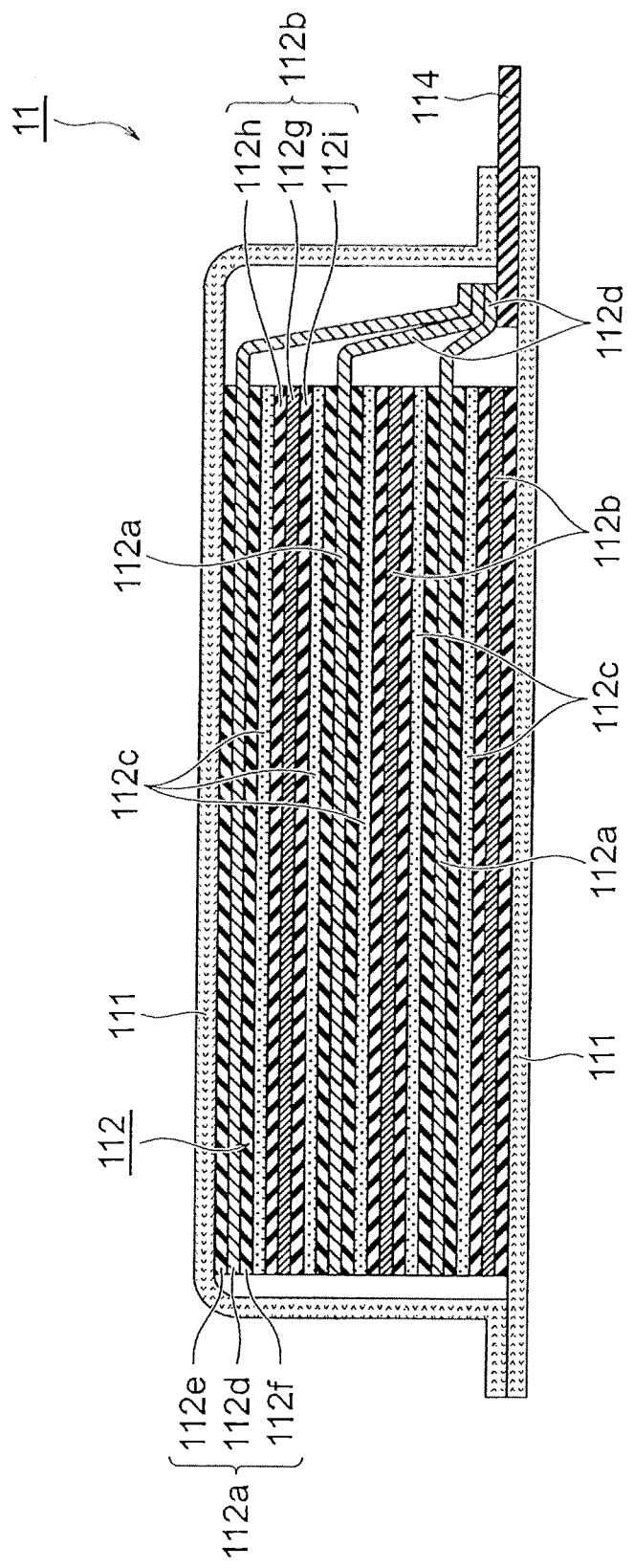
FIG. 8 is a sectional view of a battery body taken along the line VIII-VIII of FIG. 1.

Secondary battery 1 of this embodiment is a lithium-ion secondary battery, and as is seen from FIG. 8, electricity generating element 112 is constructed by placing, between positive plates 112a and negative plates 112b, separators 112c. Electricity generating element 112 of this embodiment comprises three positive plates 112a, five separators 112c, three negative plates 112b and an electrolyte which is not shown. Secondary battery 1 of the invention is not limited to the lithium-ion secondary battery, that is, the secondary battery may be of another type battery.

Positive plate 112a constituting each electricity generating element 112 comprises a positive side collector 112d that extends to positive electrode terminal 114, and positive layers 112e and 112f that are formed on both major surfaces of a part of positive side collector 112d. Although, in the embodiment, positive plate 112a and positive side collector 112d are constructed by one electric conductor, positive plate 112a and positive side collector 112d may be constructed by separate members which are to be thereafter joined.

Positive side collector 112d of positive plate 112a is constructed by an electrochemically stable metal foil such as aluminum foil, aluminum alloy foil, copper foil, nickel foil or the like. Positive layers 112e and 112f of positive plate 112a are produced by preparing a liquid mixture that includes a positive electrode active material such as a lithium complex oxide such as lithium nickelate ($LiNiO_2$), lithium manganic acid ($LiMnO_2$), Lithium cobaltic acid ($LiCoO_2$) or the like or chalcogenide (S, Se, Te) or the like, a conducting agent such as carbon black or the like, a bonding agent such as aqueous dispersion agent of polyfluoroethylene or the like and a solvent, applying the liquid mixture onto both major surfaces of positive side collector 112d, and drying and rolling the applied liquid mixture.

Negative plate 112b constituting each electricity generating element 112 comprises a negative side collector 112g that extends to negative electrode terminal 115, and negative layers 112h and 112i that are formed on both major surfaces of a part of negative side collector 112g. Although, in the embodiment, negative plate 112b and negative side collector 112g are constructed by one electric conductor, negative plate 112b and negative side collector 112g may be constructed by separate members which are to be thereafter joined.

Negative side collector 112g of negative plate 112b is constructed by an electrochemically stable metal foil such as nickel foil, copper foil, stainless steel foil, steel foil or the like. Negative layers 112h and 112i of negative plate 112b are produced by preparing a negative electrode active material such as amorphous carbon, graphitization difficult carbon, graphitization easy carbon, graphite or the like that is able to store/discharge lithium ion fed from the above-mentioned positive electrode active material, mixing the negative electrode active material with an aqueous dispersion of styrene butadiene rubber resin powder as a precursor of a burned organic body, drying the mixture, grinding the dried mixture to produce a chief material that is a mass of carbon particles that carry on their outer surfaces carbonized styrene butadiene rubber, mixing the chief material with a biding agent such as acrylic resin emulsion or the like to prepare a mixture, applying the mixture onto both major surfaces of the negative collector plate 112g, drying the applied mixture and rolling the dried mixture.

Separator 112c put between positive plate 112a and negative plate 112b is a member to prevent a short-circuit between positive plate 112a and negative plate 112b, and if desired, the separator may have a function to keep the electrolyte. Separator 112c is a microporous membrane constructed of for example a polyolefine such as polyethylene, polypropylene or the like, which has such a function that upon flow of excess current, blocking of current flow takes place due to blockage of the micropores of the layer caused by the heat produced by the excess current. The material of separator 112c is not limited to only a single layer film of polyolefine. That is, the separator may have a three-layer construction in which a polyolefine film is sandwiched between polyethylene films or a layered construction in which polyolefine microporous membrane films and organic non-woven fabrics are layered. By providing separator 112c with a layered structure, the separator 112c can be provided with various functions, such as excess current suppression function, electrolyte keeping function, shape retention function (viz., improvement in stiffness) and the like.

As is mentioned hereinabove, electricity generating element 112 has such a structure as to alternately set positive plates 112a and negative plates 112b through separators 112c. More specifically, three positive plates 112a are connected through respective positive side collectors 112d to the positive electrode terminal 114 that is constructed of a metal foil, and three negative plates 112b are connected through respective negative side collectors 112g to the negative electrode terminal 115 that is constructed of a metal foil, too.

As is understood from FIG. 1, from positive plates 112a and negative plates 112b of electricity generating element 112, there extend positive and negative electrode terminals 114 and 115 to the outside of outer cover member 111. In secondary battery 1 of this embodiment, from a peripheral portion 113a of one side (viz., shorter this side in FIG. 1) of outer cover member 111, there extend positive and negative electrode terminals 114 and 115 parallelly and outwardly. Positive and negative electrode terminals 114 and 115 can be called as positive and negative tubs 114 and 115.

In secondary battery 1 of this embodiment, positive and negative electrode terminals 114 and 115 extend outward from the peripheral portion of one side of outer cover member 111 in a parallel manner. In FIG. 8, there is shown a sectional view of a part extending from positive plates 112a of electricity generating element 112 to positive electrode terminal 114 while omitting a sectional view of another part extending from negative plates 112b of electricity generating element 112 to negative electrode terminal 115. However, negative plates 112b and negative electrode terminal 115 have the same constructions as those of positive plates 112a and positive electrode terminal 114 which are shown in FIG. 8 in a sectional manner. However, in order to suppress contact, when taken in a plan view, between positive plate 112a (positive side collector 112d) that extend from an end of electricity generating element 112 to positive electrode terminal 114 and negative plates 112b (negative side collector 112g) that extend from the end of electricity generating element 112 to negative electrode terminal 115, the positive and negative plates are cut by half or more.

Since battery body 11 is shaped rectangular in a plan view, peripheral portions 113 that are provided by joining the pair of outer cover members 111 for sealing the interior will be called peripheral portions 113a, 113b, 113c and 113d as is shown in FIG. 2. The external form of battery body 11 is not limited to the rectangular shape, that is, the form may have other polygons such as square, etc. The position from which both positive and negative electrode terminals 114 and 115 are drawn to the outside may be peripheral portion 113b that is opposite to peripheral portion 113a, peripheral portion 113c or peripheral portion 113d besides the exemplified peripheral portion 113a. Furthermore, the terminals may be drawn out from peripheral portions 113c and 113d of the longer sides.

Although battery body 11 having the above-mentioned construction is used as a single unit, it can be combined with another battery body or a plurality of secondary batteries to use the combination as a secondary battery (which will be referred to as battery module, hereinafter) that has a desired output and desired capacity. Furthermore, when a plurality of the above-mentioned battery modules are combined to produce a unit (which will be referred to as battery pack, hereinafter) and these battery packs are mounted on a motor vehicle, such as electric vehicle, hybrid vehicle or the like, they can be used as an electric power source for vehicle driving.

Figure 4:
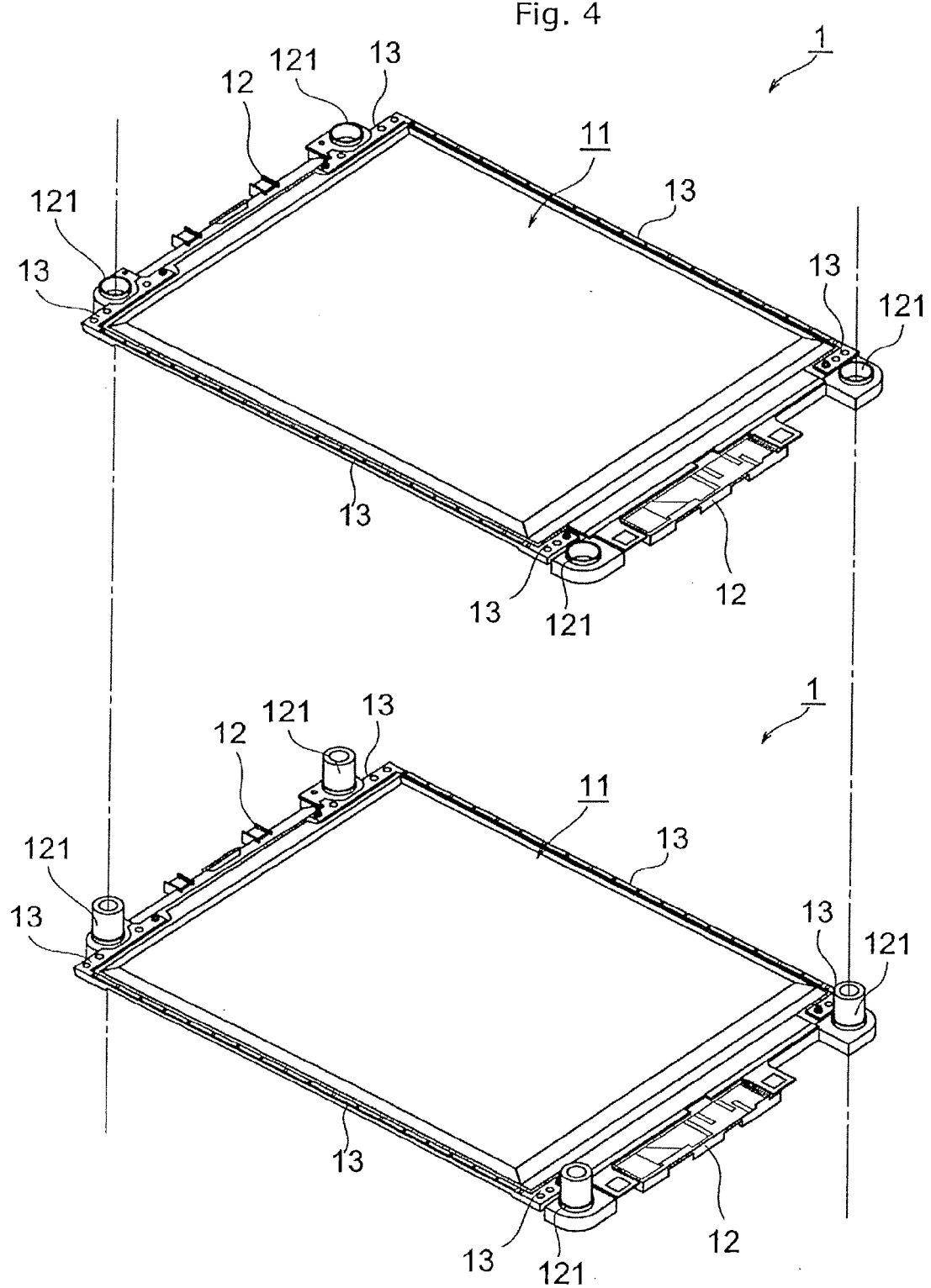
FIG. 4 is a perspective view showing a manner in which the secondary battery of FIG. 1 and another secondary battery are superposed on each other.
Figure 5:
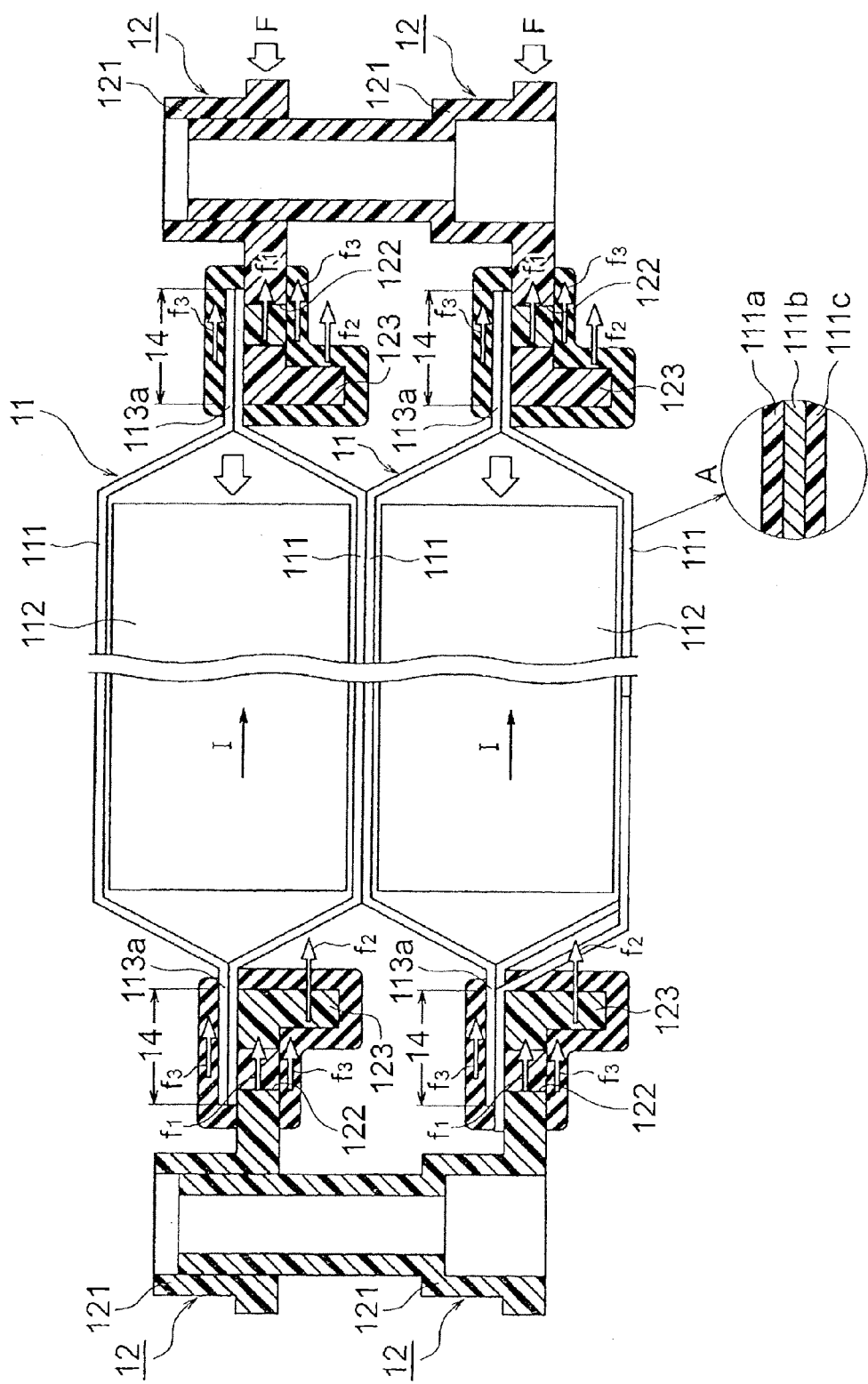
FIG. 5 is a sectional view taken along the line V-V of FIG. 1.

In case of connecting a plurality of battery bodies 11 to constitute a battery module, the batter bodies 11 are stacked on one another at their main surface portions as will be understood from FIG. 4 and then put into a battery case. In this case, positive and negative electrode terminals 114 and 115 drawn from peripheral portion 113a of battery body 11 and positive and negative electrode terminals 114 and 115 drawn from another battery body 11 that is put on the aforementioned battery body 11 are electrically insulated from one another, and at the same time, spacers 12 constructed of an insulating material are used for arranging bus bars through which positive electrode terminals 114 and negative electrode terminals 115 are connected in series or in parallel and a connector for a voltage detecting sensor.

As is seen from FIGS. 1, 2 and 5, spacers 12 used in the embodiment are put between mutually facing peripheral portions 113a and 113a of neighboring battery bodies 11, and the spacers have fixing portions 121 that are used for fixing each battery body 11 to a predetermined position, such as a position in the case of the battery module, a position of a vehicle body or the like.

Spacers 12 are constructed of an insulating resin, such as polybutylene telephthalate (PBT), polypropylene (PP) or the like that possesses a stiffness, and each spacer has an elongate shape having a length greater than that of peripheral portion 113a of battery body 11. Each spacer has at both ends respective sheath-shaped openings to constitute fixing portions 121. Although setting the length of spacer 12 to be greater than that of peripheral portion 113a to which the spacer is fixed is preferable, this is because of such a reason that input of external force is received by an entire construction of spacer 12 thereby to prevent battery body 11 from being applied with a focal stress. Accordingly, the length of spacer 12 can take a value that is very close to the length of peripheral portion 113a to which the spacer is fixed.

It is preferable that the mechanical strength (viz., stiffness, such as strength against bending and against buckling) of spacer 12 constructed of the above-mentioned PBT or PP is greater than that of the electrode plates (viz., the above-mentioned positive electrode plate 112a and negative electrode plate 112b) that constitute each electricity generating element 112 installed in battery body 11. Particularly, it is preferable to increase the mechanical strength of spacer 12 against the external force F applied in the arrow-indicated direction in FIG. 5. That is, if a very large external force is applied to spacer 12 of secondary battery 1 mounted on a motor vehicle, spacer 12 and electricity generating element 112 tend to contact to each other to induce a certain possibility of breakage of both of them. However, if, under such condition, spacer 12 is constructed hardly breakable, stable holding for secondary battery 1 is assuredly obtained.

In the vicinity of each fixing portion 121 of spacer 12, there are formed a through hole 122 and a rib 123. In FIGS. 1, 2 and 4, illustration of such parts is omitted, while, in FIGS. 3 and 5, such through hole 122 and rib 123 are shown. Through holes 122 of the embodiment are formed at both end portions of spacer 12 near any positions around fixing portions 121. Ribs 123 of the embodiment are formed on end portions of a lower surface of spacer 12 in a manner to project downward.

Through holes 122 and ribs 123 employed in the embodiment are embedded in an after-mentioned elastic resin portion 13, and the through holes and ribs may be just things that have surfaces by which a buffer power of elastic resin portion 13 is produced when the external force applied to fixing portions 121 of spacer is applied to battery body 11 through elastic resin portion 13. That is, the through holes and ribs may be just through holes, ribs or recessed portions that have surfaces that face against an input direction of the external force F shown in FIG. 5. Although, as will be mentioned hereinafter, the buffer power against the external force F is produced by elastic resin portion 13 of itself without through holes, ribs or recessed portions, provision of the through holes, ribs or recessed portions brings about increase of buffering powers f1 and f2 against the external force F as is shown in the drawing, and thus, the external force F applied to battery body 1 can be much buffered. In view of this function, through holes 122 and ribs 123 can be called as reinforced portions.

In secondary battery 1 of the embodiment, in at least surrounding parts of fixing portions 121 of each peripheral portion 113 of battery body 11 in a range that includes an overlapped portion 14 between peripheral portion 113 and spacer 12 in a sectional view of FIG. 5, there are provided elastic resin portions 13 that are produced through an insert molding of an elastic resin.

Elastic resin portions 13 are produced by a elastic resin such as vulcanized rubber, thermosetting resin elastomer, thermoplastic resin elastomer, polyamide resin (hot melt grade) or the like, and molded in the above-mentioned range through an after-mentioned insert molding method. In the embodiment, as is seen from FIG. 2, elastic resin portions 13 are formed also in ranges H2 of peripheral portions 113c and 113d (viz., peripheral portions of the longer sides) of battery body 11 in addition to the surrounding parts H1 of fixing portions 121. If desired, elastic resin portion 13 may be formed on a whole part of peripheral portion 113.

As is understood from the sectional view of FIG. 5, elastic resin portion 13 formed in the ranges H1 shown in FIG. 2 embeds therein overlapped portion 14 between peripheral portion 113a of battery body 11 and spacer 12 thereby to join these peripheral portion 113a and spacer 12. Through holes 122 formed in spacer 12 are filled with the elastic resin. When an external force F, such as a force caused by a vehicle vibration, that is applied to each fixing portion 121 of spacer 12 is applied to peripheral portion 113a of battery body 11, elastic resin portion 13 of itself, through hole 122 and rib 123 are forced to produce buffer powers f3, f1 and f2.

As is shown in FIG. 5, when fixing portions 121 and 121 by which both ends of battery body 11 are connected to a battery module or a vehicle body are applied with an external force F directed in a left direction in the drawing, battery body 11 is also applied with a force in a left direction. Under this condition, each electricity generating element 112 hermetically installed in battery body 11 is held by only both the joining that is made between each of positive and negative electrode terminals 114 and 115 and peripheral portion 113 of outer cover member 111 and a friction force that is produced between electricity generating element 112 and outer cover member 111 and induced by pressure reduction in the interior of outer cover member 111. Accordingly, when the external force F applied to fixing portions 121 and 121 is directly transmitted to battery body 11, the hermetically installed electricity generating element 112 is applied with an inertial force I in a right direction against the external force F thereby causing a relative displacement between electricity generating element 112 and outer cover member 111, which causes displacement of collectors 112d and 112g increasing undesired possibility of short circuit therebetween.

However, in secondary battery 1 of the embodiment, as is seen from FIG. 5, each outer cover member 111 of battery body 11 and spacers 12 are joined by elastic resin portions 13 and the spacers support battery body 11 through elastic resin portions 13 at both ends of battery body 11. Thus, as is seen from FIG. 5, when fixing portion 121 of spacer 12 is applied with an external force F in a left direction, both elastic resin portions 13 and 13 are forced to produce buffer powers f1 to f3 against the external force F that is about to be applied to battery body 11 thereby to reduce a force received in a given time. As a result, the displacement between electricity generating element 112 and outer cover member 111 is restrained and thus a short circuit between collectors 112d and 112g can be suppressed. That is, the external force applied to battery body 11 can be buffered, and thus, stability condition of battery body 11 is increased. Particularly, elastic resin portion 13 exhibits an excellent external force buffering function by a resilient force thereof against a relatively high frequency vibration, such as a vibration of a motor vehicle or the like.

Figure 6:
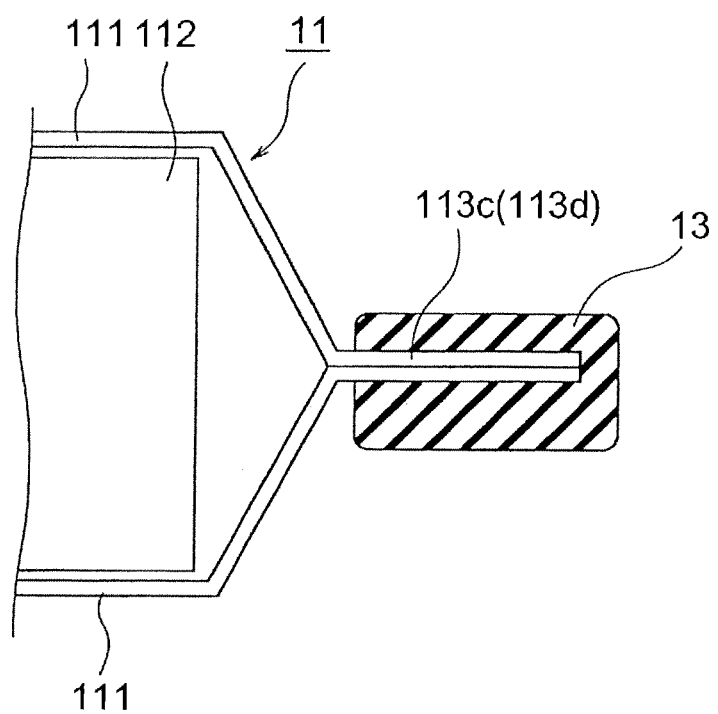
FIG. 6 is a sectional view taken along the line VI-VI of FIG. 1.

On the other hand, as is seen from FIG. 6, elastic resin portions 13 formed in the range H2 of FIG. 2 are arranged to extend along the entire length of peripheral portions 113c and 113d while embedding edge surfaces of the paired outer cover members 111 and 111. Due to provision of elastic resin portions 13 that extend the entire length of peripheral portions 113c and 113d, potential leakage from electricity generating element 112, which would take place from the contacting surfaces of peripheral portions 113c and 113d, can be prevented. By joining elastic resin portion 13 formed in the range H1 and the other elastic resin portion 13 formed in the range H2, part of the external force F applied to spacer 12 can be dispersed to elastic resin portion 13 formed in the range H2, and thus, the external force transmitted to battery body 11 can be reduced.

It is preferable that hardness of elastic resin portion 13 formed in the range H1 is smaller than that of outside resin layer 111c that constitutes outer cover member 111 of battery body 11. This is because of the following reason. That is, in case wherein, due to application of a remarkably excessive external force to spacer 12 due to input of external force F, elastic resin portion 13 and outer cover member 111 make a contact therebetween at first, outer cover member 111 would be scratched if the hardness of elastic resin portion 13 is high. Setting of the hardness of elastic resin portion 13 can be made by the grade of the material of resin that is used besides the type of the material.

In the following, a method of producing secondary battery 1 of the embodiment will be described.

At first, electricity generating element 112 is put into the paired outer cover members 111 of laminated film, and electrolyte is fully poured into the outer cover members, and peripheral portions 113 of the outer cover members 111 are sealed. With these steps, battery body 11 is obtained. And, at the same time, spacers 12 are molded, each having fixing portions 121, through holes 122 and ribs 123.

Figure 7:
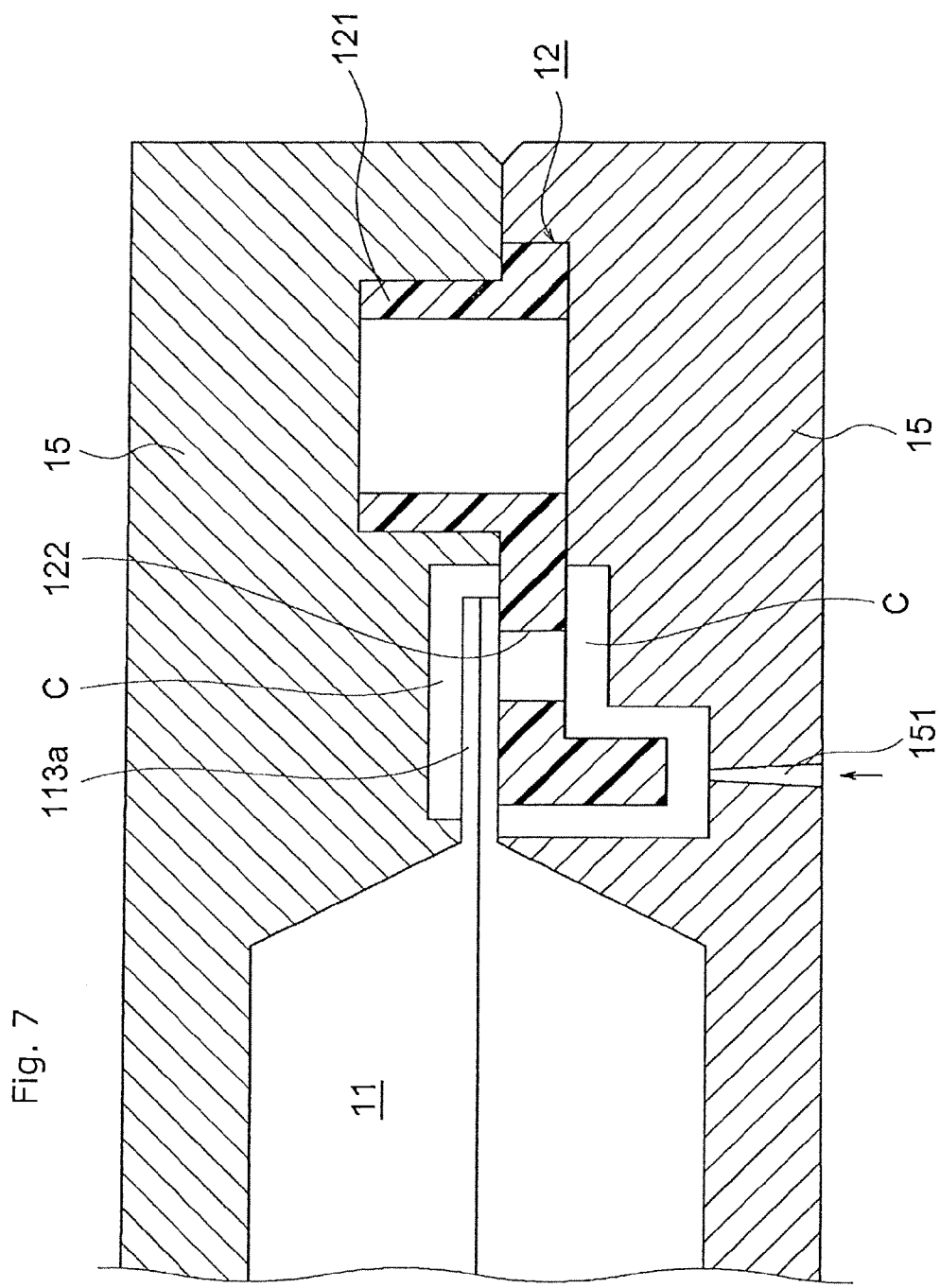
FIG. 7 is a sectional view of an essential portion used for explaining a method of producing the secondary battery of FIG. 1.

Then, as is seen from FIG. 7, battery body 11 and spacers 12 are set in injection molding dies 15 and 15, which are previously prepared, in such a manner that each spacer 12 and peripheral portion 113a (illustration of peripheral portion 113b is omitted) of battery body 11 are laid to overlap each other, and then, the dies are fastened. With this fastening, there is formed or defined in the fastened dies a cavity C of which shape corresponds to that of elastic resin portion 13 to be formed in the ranges H1 and H2, and then, a molten resin is poured into the cavity through a sprue 151. During this resin pouring, the molten resin is led into through holes 122 formed in each spacer 12.

As is described hereinabove, in secondary battery 1 of the embodiment, elastic resin portion 13 is formed in the range H1 that is at least around each fixing portion 121, and thus, as is seen from FIG. 5, when the external force F applied through fixing portion 121 is applied to battery body 11 through spacer 12, elastic resin portion 13 is forced to produce a buffer power by itself. With this, the external force applied to battery body 11 can be buffered and thus, stability condition of battery body 11 is increased. Particularly, elastic resin portion 13 exhibits an excellent external force buffering function by a resilient force thereof against a relatively high frequency vibration, such as a vibration of a motor vehicle or the like.

Furthermore, during this time, through holes 122 and ribs 123 provided by spacer 12 are forced to produce a buffer power f1 and f2, and thus, the external force applied to battery body 11 can be much effectively buffered, and thus, stability condition of battery body 11 is much effectively improved.

Furthermore, by making the length of spacer 12 longer than that of peripheral portion 113a to which spacer is mounted, the input of the external force F can be entirely held by spacer 12, and thus, partial application of stress to battery body 11 can be suppressed.

Furthermore, the hardness of elastic resin portion 13 formed in the range H1 is set smaller than that of outside resin layer 111c that constitutes outer cover member 111 of battery body 11. Accordingly, even if, due to application of excessive external force to spacer 12 due to vehicle collision or the like, elastic resin portion 13 and outer cover member 111 make a contact therebetween, scratch of outer cover member 111 caused by elastic resin portion 13 can be suppressed.

Furthermore, the mechanical strength of spacer 12 is set higher than that of the electrode plates of electricity generating element 112. Thus, even in case wherein due to a vehicle collision or the like, a remarkably big external force is applied to spacer 12 inducing a possibility of contact between spacer 12 and electricity generating element 112 and thus breakage of them, spacer 12 would avoid breakage and thus, stable holding of secondary battery 1 can be obtained.

Furthermore, due to presence of elastic resin portion 13 formed in the range H2, potential leakage from electricity generating element 112, which would take place from the contracting surfaces of peripheral portions 113c and 113d, can be suppressed, and thus, reduction of capacity of secondary battery 1 can be suppressed. Since elastic resin portion 13 formed in the range H1 and elastic resin portion 13 formed in the range H2 are connected, part of the external force F applied to spacer 12 can be dispersed to elastic resin portion 13 formed in the range H2, and thus, the external force transmitted to battery body 11 can be reduced.

Furthermore, since elastic resin portion 13 is produced through an insert molding, production time and production process can be reduced, and cost reduction of secondary body 1 can be obtained.

Second Embodiment

Figure 9:
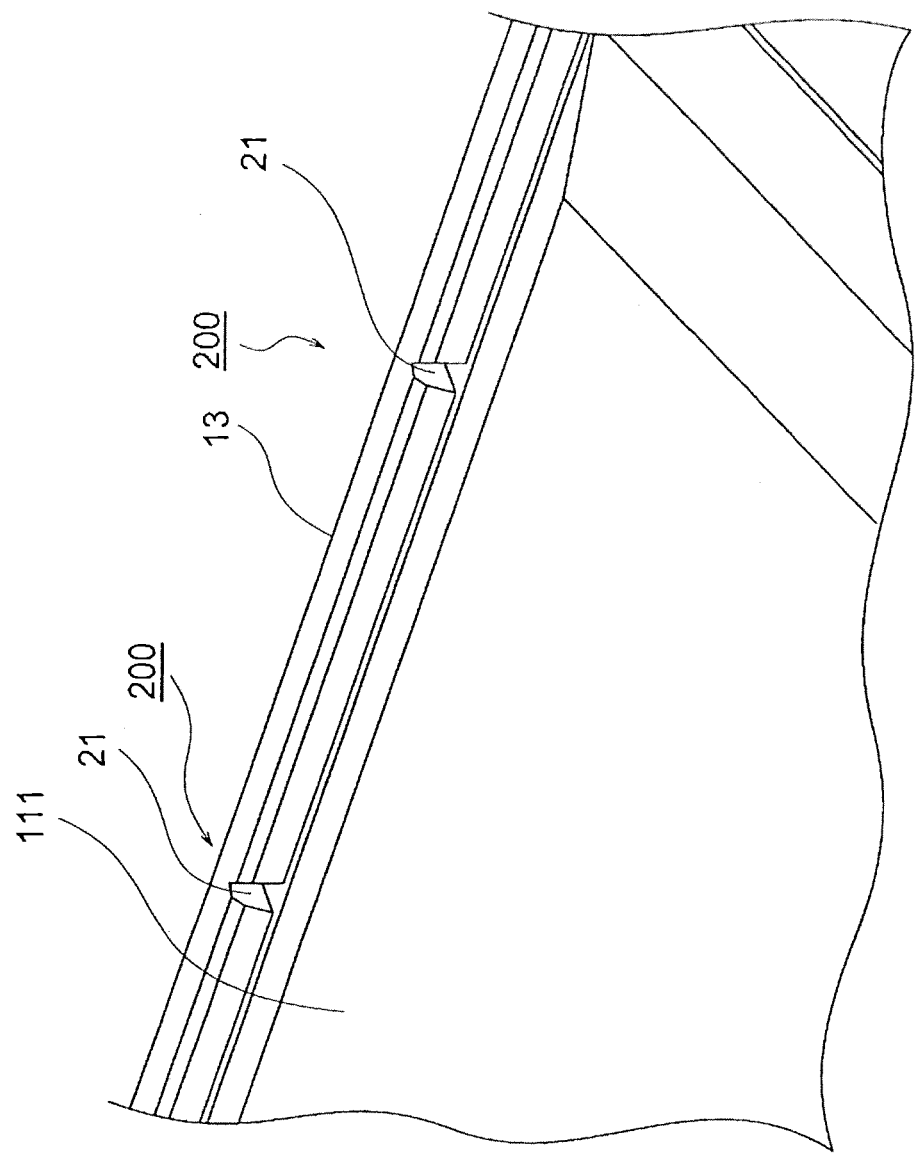
FIG. 9 is an enlarged view of a portion enclosed by the line indicated by IX of FIG. 1, showing a secondary battery of the other embodiment of the present invention.
Figure 10:
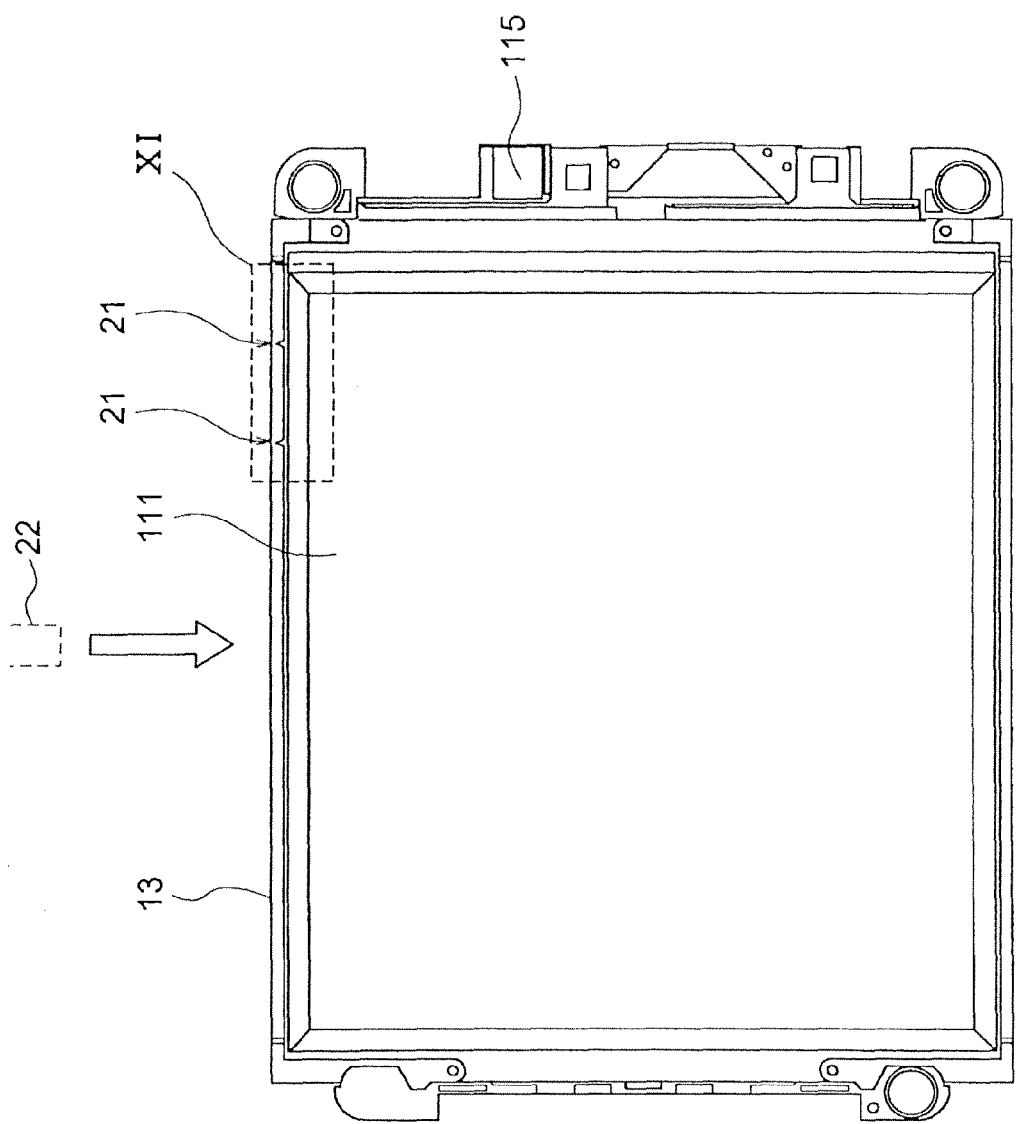
FIG. 10 is a plan view of the secondary battery of the other embodiment of the present invention.
Figure 11:
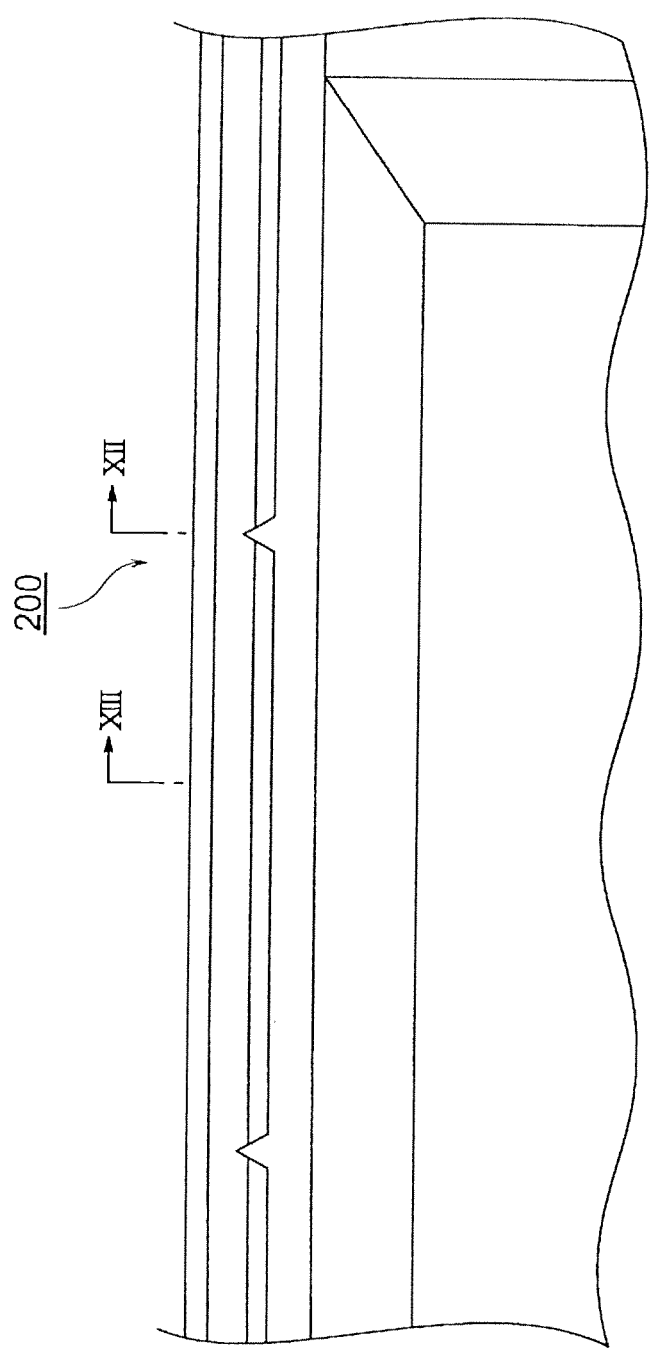
FIG. 11 is an enlarged view of a portion enclosed by the line X1 of FIG. 10.

FIG. 9 shows a secondary battery which is a second embodiment of the present invention, which is an enlarged view of a part enclosed by a broken line IX of FIG. 1. FIG. 10 is a plan view of the secondary battery of the second embodiment, and FIG. 11 is an enlarged view of the part enclosed by the broken line IX of FIG. 10. In this second embodiment, fragile portions 200 are employed in its construction, which is different from the construction of the first embodiment. Because the other construction is the same as that of the above-mentioned first embodiment, description on the first embodiment will be suitable used.

Elastic resin portion 13 formed around the peripheral portion of the pared outer cover members 111 is formed with fragile portions 200. Fragile portions 200 are provided by cut portions 21, and each cut portion 21 shows a V-shape when viewed from a direction of main surface of secondary battery 1. Each cut portion 21 is provided by making a cut in elastic resin portion 13 from an inner wall of elastic resin portion 13 facing a central portion of secondary battery 1 toward an outer wall of the elastic resin portion facing an outside of secondary battery 1, and cut portion 21 is formed in a part from the inner wall to the outer wall.

Cut portions 21 are formed in a downstream side of the elastic resin that is a material of elastic resin portion 13. As will be understood from FIG. 10, in case of forming elastic resin portion 13 by an insert molding process, a resin pouring opening 22 for pouring the molten resin is placed at a generally middle position of one lower side of outer cover member 13, and then, the molten resin is poured into a given groove along a peripheral portion of outer cover member 13. Under this condition, an upstream side for the molten resin is the position where resin pouring opening 22 is placed and a downstream side for the molten side is each end of the longer side of outer cover member 13. Thus, cut portions 21 are formed at a downstream position relative to the resin pouring opening 22. Furthermore, cut portions 21 are formed in elastic resin portion 13 that covers one of the four sides of outer cover member 111 where there are no positive and negative electrode terminals 114 and 115 being drawn to the outside.

Figure 12:
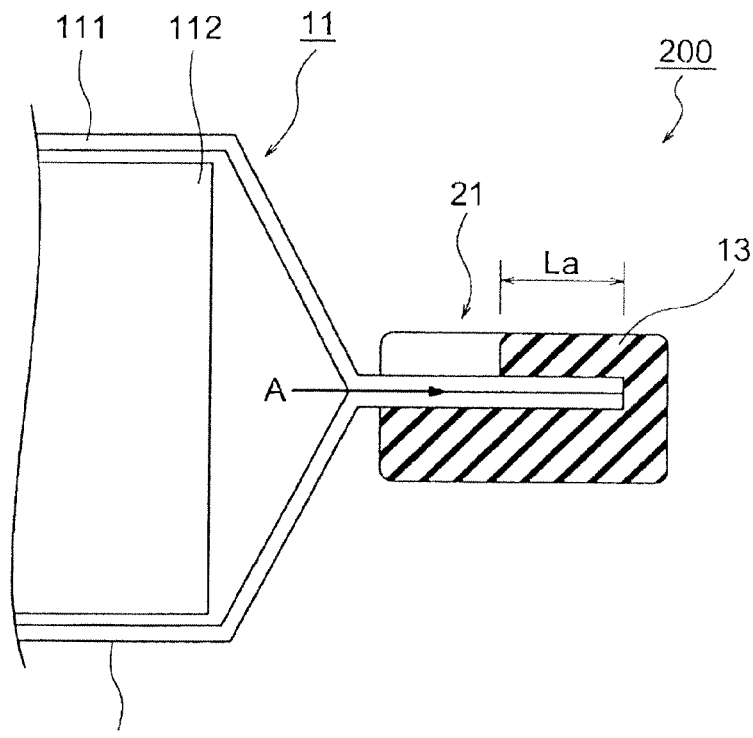
FIG. 12 is a sectional view taken along the line XII-XII of FIG. 11.
Figure 13:
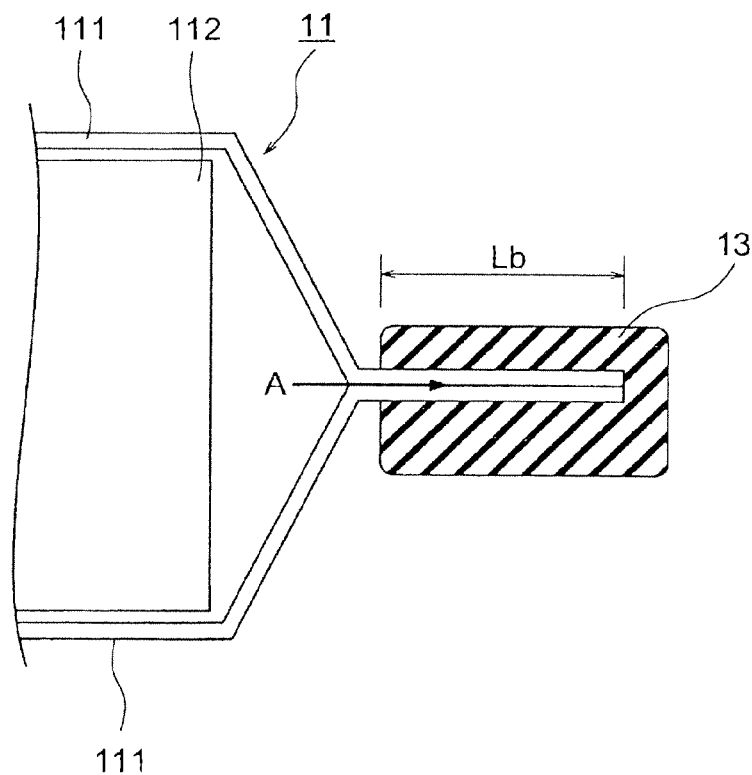
FIG. 13 is a sectional view taken along the line XIII-XIII of FIG. 11.

In the following, operation of fragile portions 200 will be described with the aid of FIGS. 12 and 13. FIG. 12 is a sectional view taken along the line XI-XI of FIG. 11, which is a sectional view of a portion that includes cut portions 21. FIG. 13 is a sectional view taken along the line XII-XII of FIG. 11, which is a sectional view of a portion that does not include cut portions 21.

As is understood from FIGS. 12 and 13, of the peripheral portions of the paired outer cover members 111, the peripheral portion possessed by the upper outer cover member 111 has a contact area with elastic resin portion 13, which contact area is smaller than a contact area between the elastic resin portion and the peripheral portion of the other outer cover member that has not cut portions 21. In other words, when imaging a boundary surface between the upper outer cover member 111 and elastic resin portion 13, the length from one end placed at an outer side of outer cover member 111 to the other end placed at an inner side of outer cover member 111 shows a small value (viz., La of FIG. 12) at a portion where cut portions 21 are provided as compared with a value (viz., Lb of FIG. 13) at a portion where cut portions 21 are not provided. That is, in secondary battery 1 of this embodiment, with provision of cut portions 21, the contact area at the boundary surface between the upper outer cover member 111 and elastic resin portion 13 of the part where cut portions 21 are provided is made smaller than the contact area at the boundary surface of the part where cut portions 21 are not provided, so that adhesive strength of the part where the cut portions are provided is made small thereby to cause the portion where the cut portions 21 are provided to act as fragile portions 200.

When, due to long-term deterioration or the like of secondary battery 1, electricity generating element 112 discharges a gas, the latter tends to leak to the outside (as is indicated by the arrow A in FIGS. 12 and 13) through a portion where the electricity generating element is sealed, that is, the peripheral portion of outer cover member 111, more specifically, the overlapped portion (viz., the portion where heat seal is made) between upper and lower members 111 of the pared outer cover members 111. Of the portion where upper outer cover member 111 and lower outer cover member 111 are overlapped, an outside end of the paired outer cover members 111 is covered with elastic resin portion 13 and thus the shear strength corresponding to the base material strength of elastic resin portion 13 is higher than an adhesive strength between elastic resin portion 13 and outer cover member 111, and thus, the gas tends to flow along the boundary between elastic resin portion 13 and outer cover member 111 in a direction opposite to a direction in which the gas flows out at the overlapped portion of the paired outer cover members 111. Since, as is mentioned hereinabove, on the boundary surface between the upper outer cover member 111 and elastic resin portion 13, the length from one end of the outer side of outer cover member 111 to the other end of the inner side of outer cover member 111 is smaller, the portion where cut portions 21 are provided has such a tendency as to easily discharge the gas therefrom as compared with the other portion where cut portions 21 are not provided. Thus, cut portions 21 serve as an outlet for the gas discharged from electricity generating element 112.

That is, in this embodiment, by providing a portion of the boundary surface between elastic resin portion 13 and outer cover member with cut portions 21, the portion is made fragile and easy to gas discharge as compared with the other portion where cut portions 21 are not provided. If elastic resin portion 13 is not provided with cut portions 21, the gas that would be discharged from electricity generating element 112 fails to find a suitable gas outlet and thus an internal pressure of the paired outer cover members 111 is increased. While, in the embodiment, provision of cut portions 21 causes portions near cut portions 21 to become fragile portions 200, and thus, a suitable gas outlet is assuredly provided and thus, gas discharging is permitted before the internal pressure of the paired outer cover members 111 is increased to an excessive level.

As is mentioned hereinabove, in secondary battery 1 of the embodiment, elastic resin portion 13 is formed with fragile portions 200 provided by cut portions 21. Thus, when a gas is discharged from electricity generating element 112, the gas can be released before the internal pressure in secondary battery 1 increases to an excessive level. That is, since, of the boundary surface between outer cover member 111 and elastic resin portion 13, a surrounding portion including fragile portions 200 shows an adhesive strength that is lower than that of the other portion, the surrounding portion becomes fragile. Upon gas generation, the gas is discharged to the outside from the surrounding portion, and thus, increase of the inner pressure of the paired cover members 111 can be suppressed.

In secondary battery 1 of the embodiment, cut portions 21 are provided in elastic resin portion 13 located inside of the peripheral portion of the paired outer cover members 111. Thus, the gas discharged from electricity generating element 112 is forced to flow toward the inside of the peripheral portion of the paired outer cover members 111, not toward the outside of the peripheral portion of the paired outer cover members 111, and thus, other influences to battery by the discharged gas can be suppressed.

In secondary battery 1 of the embodiment, the portion where negative and positive electrode terminals 114 and 115 are drawn to the outside is formed on elastic resin portion 13 that is other than a part of the peripheral portion of the paired outer cover members 111. Thus, the gas is permitted to leak from a portion where negative and positive electrode terminals 114 and 115 are drawn to the outside, influence to negative and positive electrode terminals 114 and 115 by the discharged gas can be suppressed.

In secondary battery 1 of the embodiment, the adhesive strength (viz., the adhesive strength of the portion having the length La in FIG. 12 where the paired outer cover members 111 and elastic resin portion 13 contact) of fragile portions 200 where cut portions 21 are provided is made lower than the base material strength of elastic resin portion 12. With this, even if gas is discharged from the heat sealed overlapped portion of the paired outer cover members 111, the gas is forced to run along the boundary surface between the paired outer cover members 111 and elastic resin portion 13 and discharge from cut portions 21, without shearing elastic resin portion 13 for being discharged to the outside.

In secondary battery 1 of the embodiment, when elastic resin portion 13 is formed by subjecting an elastic resin material to an insert molding, fragile portions 200 are formed at a downstream side of the elastic resin material. At the downstream side of the elastic resin portion, the adhesive strength of the bounder surface between the paired outer cover members 111 and elastic resin portion is lower than that at an upstream side of the elastic resin portion. Accordingly, in the embodiment, by providing the downstream side of the elastic resin portion with fragile portions 200, the gas releasing opening can be controlled.

Figure 14:
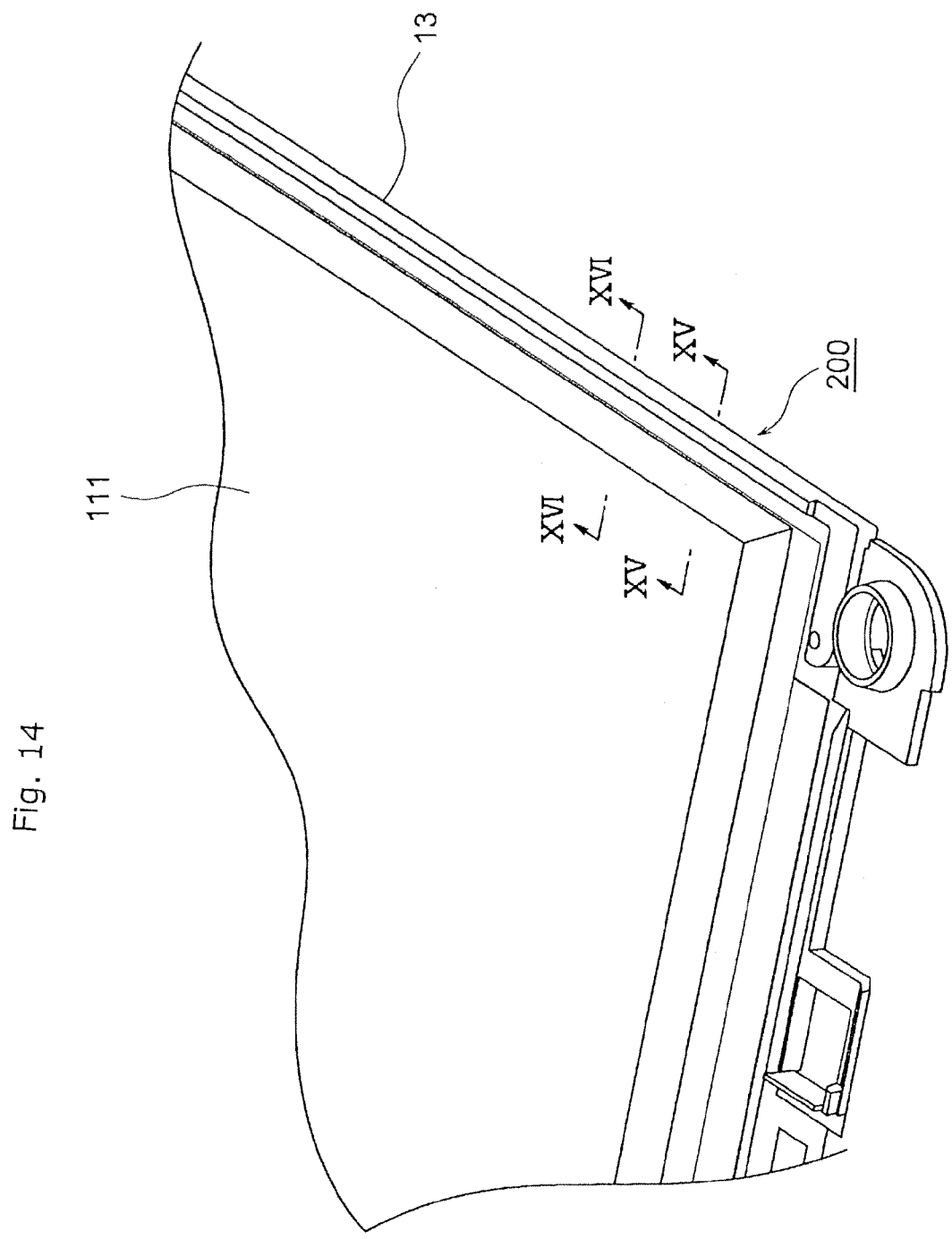
FIG. 14 is a view of a portion indicated by the arrow XIV of FIG. 1, showing a secondary battery (modification) of the other embodiment of the present invention.
Figure 15:
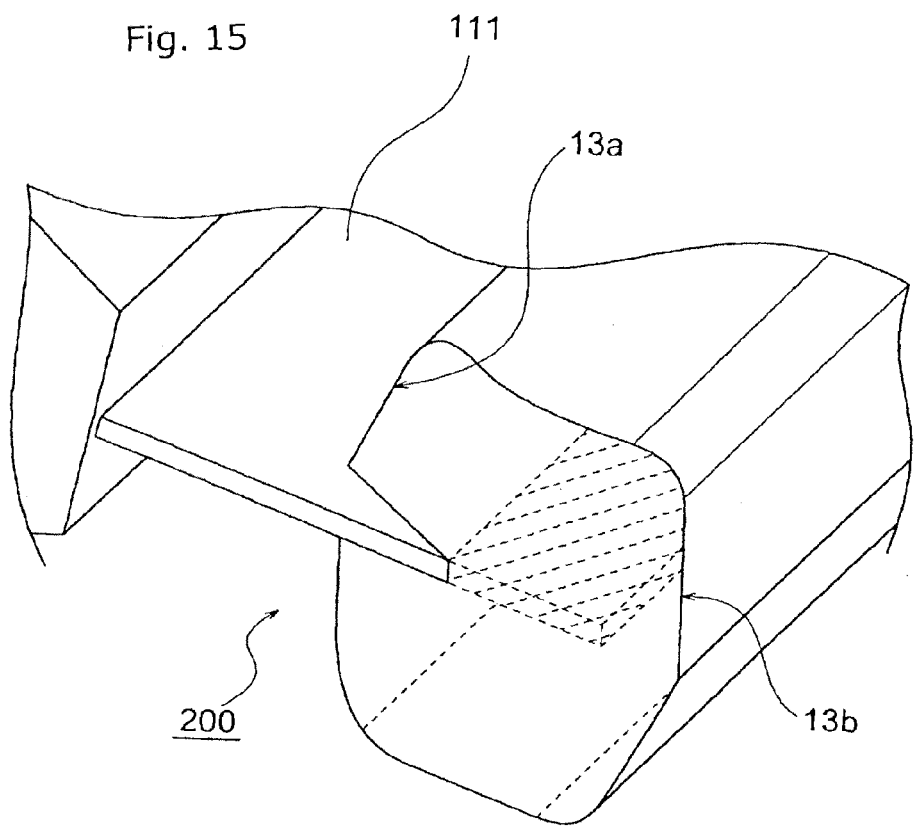
FIG. 15 is a partial cut view taken along the line XV-XV of FIG. 14.
Figure 16:
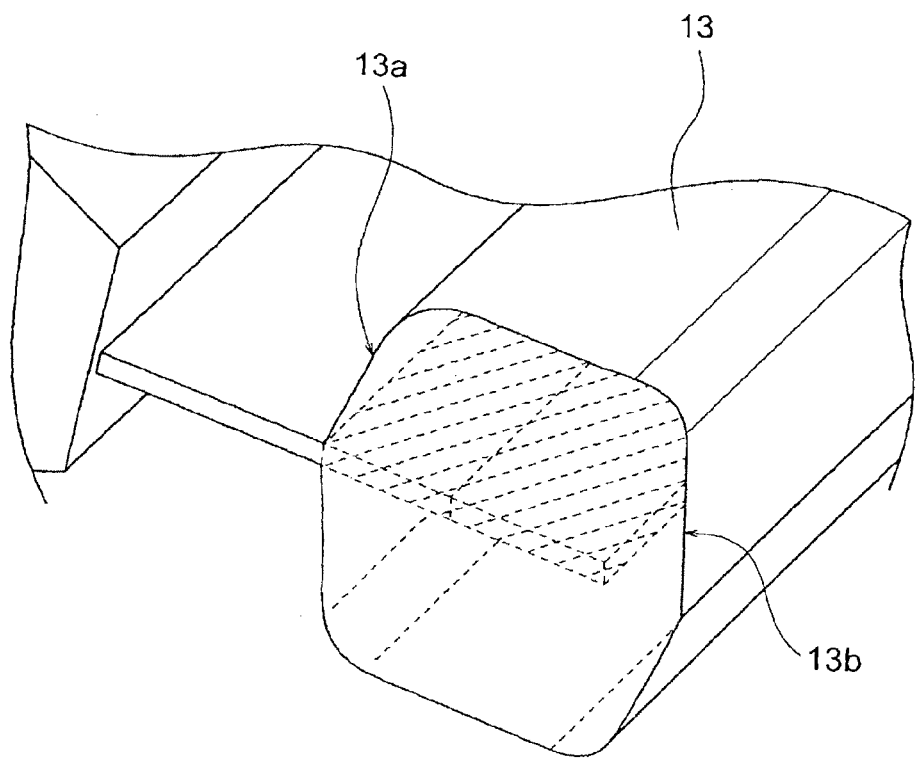
FIG. 16 is a partial cut view taken along the line XVI-XVI of FIG. 14.

Although in the embodiment each cut portion 21 is provided by cutting elastic resin portion 13 in such a manner that the cut portion has a V-shape when viewed from a direction of the main surface of secondary battery 1, the cut portion 21 may be provided by, as is seen from FIGS. 14 to 16, cutting elastic resin portion 13 in such a manner that the cut advances from a wall surface of elastic resin portion 13 toward the interior of elastic resin portion 13. FIG. 14 is view of a portion indicated by the arrow XIX of FIG. 1. FIG. 15 is a partial cut view taken along the line XV-XV of FIG. 14, and FIG. 16 is a partial cut view taken along the line XVI-XVI of FIG. 14.

Cut portion 21 is provided in elastic resin portion 13 in such a manner as to have a height that gradually reduces in a direction from an inner wall 13a (viz., the wall of elastic resin portion 13 which faces the electricity generating element) of elastic resin portion 13 to an outer wall 13b (viz., the wall of elastic resin portion 13 which faces in a direction away from the wall that faces the electricity generating element), and thus, within a range from the inner wall 13a of elastic resin portion 13 to a halfway to the outer wall 13b of elastic resin portion 13, there is not established adhesion between the paired outer cover members 111 and elastic resin portion 13. While, in the portion of elastic resin portion 13 where there is no cut portion 21, within a range from the inner wall 13a of elastic resin portion 13 to a halfway to the outer wall 13b of elastic resin portion 13, there is established adhesion between the paired outer cover members 111 and elastic resin portion 13. The cut portion 21 is formed in the inner wall 13a of elastic resin portion 13 in such a manner that, at the boundary surface between the upper outer cover member 111 and elastic resin portion 13, the length from one end located at an outer part of the outer cover member 111 to the other end located at an inner part of the outer cover member 111 is small at the portion where the cut portion 21 is provided as compared with the portion where the cut portion 21 is not provided.

Third Embodiment

Figure 17:
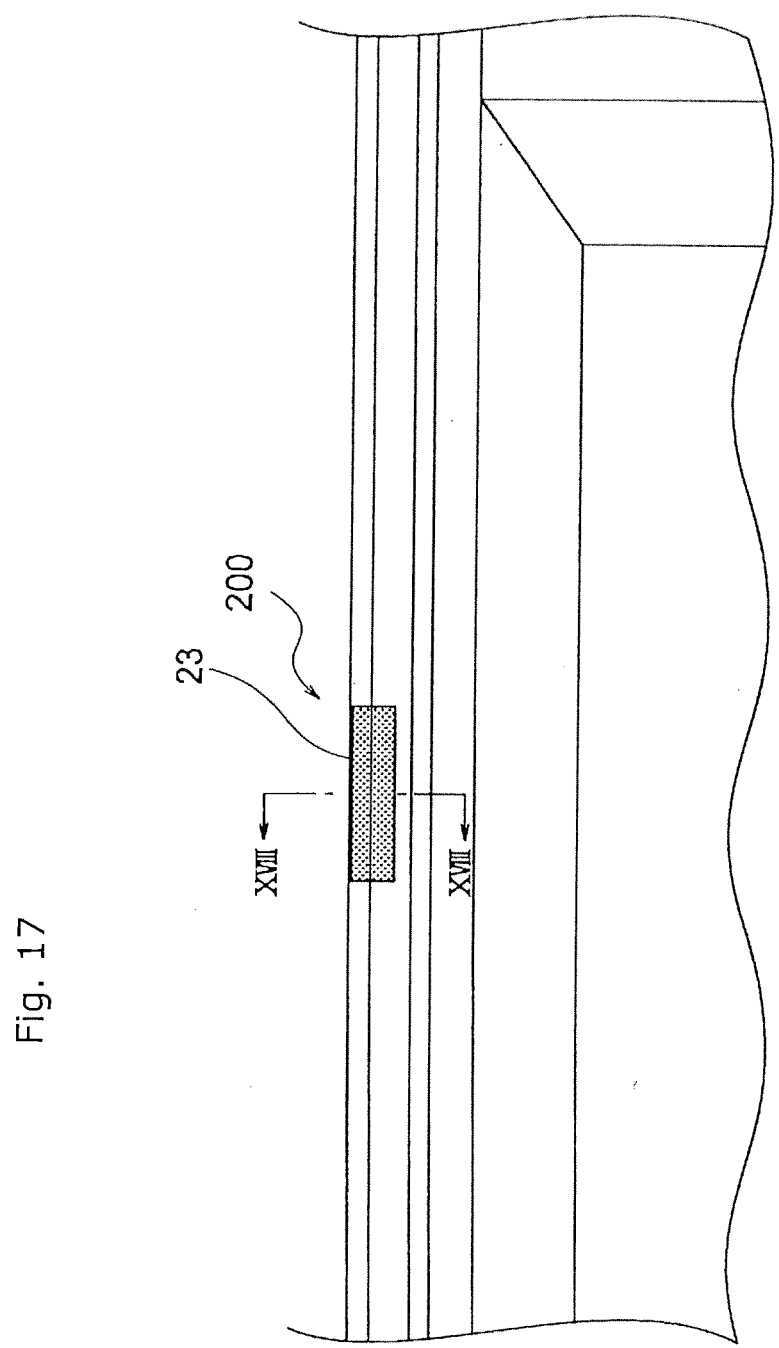
FIG. 17 is a drawing corresponding to an enlarged view of a portion enclosed by the line X1 of FIG. 10, showing a secondary battery of the other embodiment of the present invention.
Figure 18:
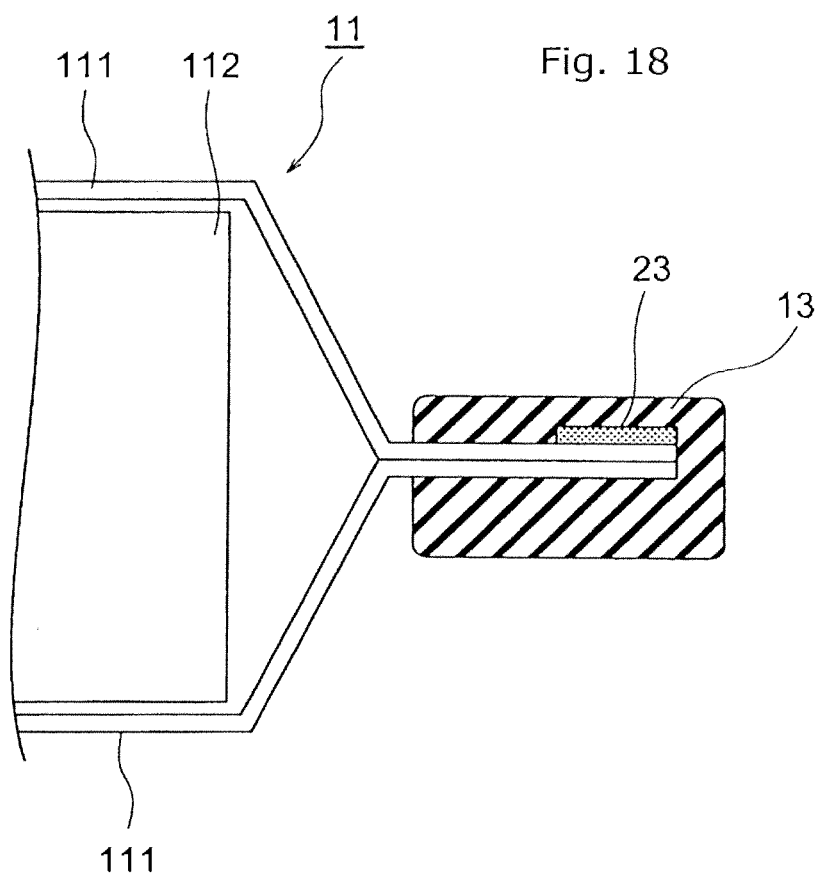
FIG. 18 is a sectional view taken along the line XVIII-XVIII of FIG. 17.

FIG. 17 shows a secondary battery which is a third embodiment of the present invention, which corresponds to an enlarged view of a portion enclosed by the dotted line X1 of FIG. 10. FIG. 18 is a sectional view taken along the line XVIII-XVIII of FIG. 17. In this embodiment, construction of fragile portion 200 is different from that of the above-mentioned second embodiment. The other construction is the same as that of the above-mentioned first and second embodiments, and thus, description of the third embodiment will be suitably invoked by that of the first and second embodiments.

Elastic resin portion 13 formed around the peripheral portion of the paired outer cover members 111 is formed with a fragile portion 200. Fragile portion 200 is formed by an adhesive strength reduced portion 23, and adhesive strength reduced portion 23 is a belt-shaped portion that extends along the boundary surface between the paired outer cover members 111 and elastic resin portion 13. Adhesive strength reduced portion 23 is provided in a portion that extends from an end located at an outer side of the outside outer cover member 111 to the other end located at an inner side of the outside outer cover member 111.

Method of producing adhesive strength reduced portion 23 will be described. That is, at the time of forming elastic resin portion 13 on the paired outer cover members 111, a part of the outer surface of the peripheral portion of the paired outer cover members 111 where the adhesive strength reduced portion 23 is to be provided is applied with a mold releasing agent, such as silicone or the like, by means of a splay device, or applied with a tape containing the mold releasing agent, and then, a material of elastic resin portion 13 is applied to the peripheral portion of the paired outer cover members 111 for formation of the elastic resin portion 13. With this way, the adhesive strength of the boundary surface between elastic resin portion 13 and the paired outer cover members 111, namely, of the adhesive strength reduced portion 23, becomes lower than that of the other boundary surface.

That is, in the embodiment, by providing elastic resin portion 13, which is located at the boundary surface between elastic resin portion 13 and the paired outer cover members 111, with an adhesive strength reduced portion 23, the resilient portion is made fragile as compared with other portion where the adhesive strength reduced portion 23 is not provided, and thus the elastic resin portion is easy to leak a gas therefrom. In case wherein elastic resin portion 13 is not provided with adhesive strength reduced portion 23, the gas produced by electricity generating element 112 fails to find a suitable gas discharge opening and thus the internal pressure of the paired outer cover members 111 is increased. While, in the embodiment, due to provision of the adhesive strength reduced portion 23, a portion near the adhesive strength reduced portion 23 becomes the fragile portion 200 and thus, the gas releasing opening can be defined, and thus, the gas can be released before the internal pressure of the paired outer cover members 111 is increased to an excessively high level.

As is described hereinabove, in secondary battery 1 of the embodiment, elastic resin portion 13 is formed with a fragile portion 200 made by adhesive strength reduced portion 23. Thus, when a gas is produced by electricity generating element 112, the gas can be released before the internal pressure of secondary battery 1 is increased to an excessively high level. That is, the portion including the fragile portion 200 at the boundary surface between the paired outer cover members 111 and elastic resin portion shows an adhesive strength that is smaller than that at the other portion, and thus, the portion including the fragile portion becomes fragile. Upon generation of the gas, the gas is permitted to be released from the peripheral portion, and thus, increase of the internal pressure of the paired outer cover members 111 can be suppressed.

Figure 19:
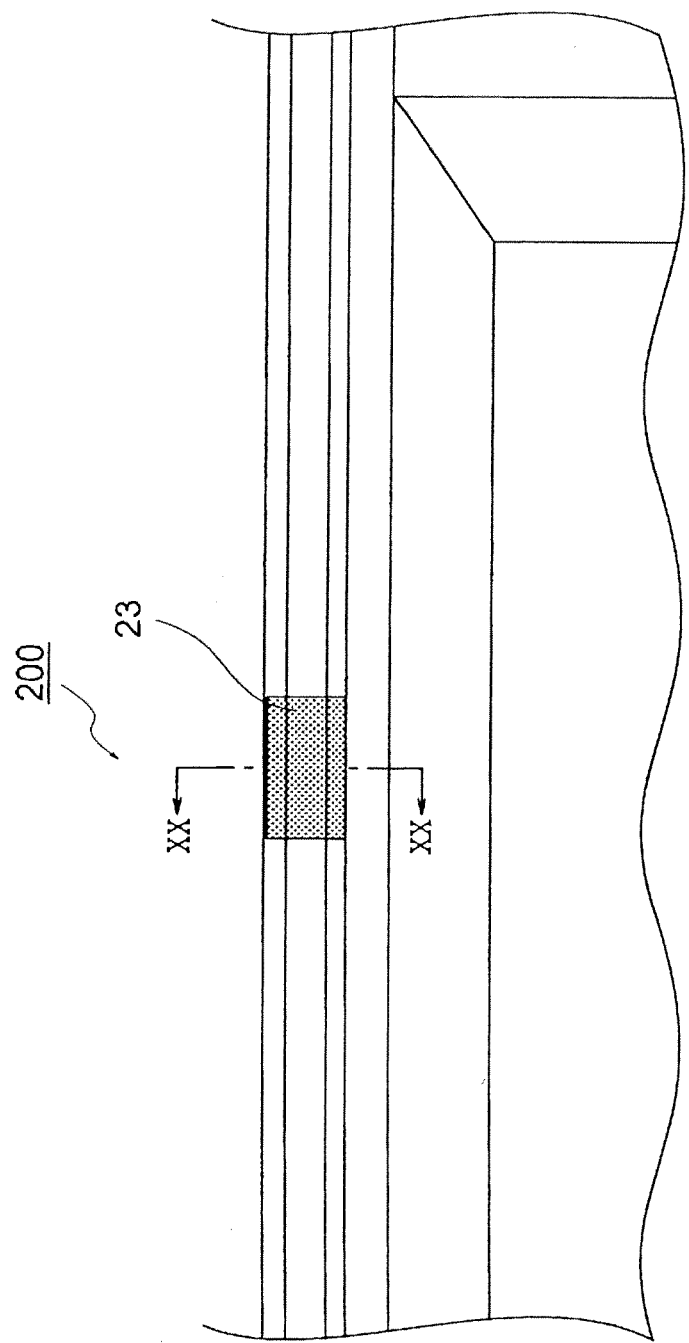
FIG. 19 is a drawing corresponding to an enlarged view of a portion enclosed by the line X1 of FIG. 10, showing a secondary battery of the other embodiment of the present invention.

As is seen from FIGS. 19 and 20, in this embodiment, the adhesive strength reduced portion 23 may be provided at a portion that extends from one end located at an outer side of the upper outer cover member 111 to the other end located at an inner side of the upper outer cover member 111. FIG. 19 shows a secondary battery 1 of a modification of the present invention, which corresponds to the enlarged view of the portion enclosed by the dotted line X1 of FIG. 10, and FIG. 20 is a sectional view taken along the line XX-XX of FIG. 19.

In FIGS. 18 and 20, the adhesive strength reduced portion 23 is shown to have a certain thickness for explanation thereof. However, in fact, thickness of adhesive strength reduced portion 23 is substantially zero, and thus, elastic resin portion 13 and the upper outer cover member 111 are flush with each other.

The invention claimed is:

1. A thin battery comprising:
    a battery body having an electricity generating element hermetically installed in an outer cover member;
    a spacer that is arranged between respective peripheral portions of said battery body and another battery body put on said battery body; and
    an elastic body that is respectively connected to said battery body and the spacer thereby to connect said battery body and the spacer,
    wherein the spacer is formed, at a portion to be connected to the elastic body, with a reinforced portion having a surface that faces against a direction in which an external force is applied from a direction parallel to a main face of said battery body.

2. A thin battery as claimed in claim 1, in which the reinforced portion is one of a portion where a through hole is formed, a portion where a recessed portion is provided and a portion where a rib is formed.

3. A thin battery as claimed in claim 1, in which an outer peripheral portion of said battery body that is other than the outer peripheral portion of said battery body where the elastic body is formed is formed with another elastic body to seal an end face of the outer peripheral portion.

4. A thin battery as claimed in claim 3, in which the outer cover member is made of a laminated film containing therein a resin layer, and in which the hardness of the other elastic body is smaller than that of the resin layer.

5. A thin battery as claimed in claim 1, in which the length of an elongate side of the spacer is greater than that of the outer peripheral portion of said battery body where the spacer is arranged.

6. A thin battery as claimed in claim 1, in which the outer cover member is made of a laminated film containing therein a resin layer, and in which the hardness of said elastic body is smaller than that of the resin layer.

7. A thin battery as claimed in claim 1, in which the mechanical strength of the spacer is greater than that of an electrode plate of the electricity generating element.

8. A thin battery as claimed in claim 1, in which the spacer has a fixing portion for fixing said battery body to a predetermined position.

9. A thin battery as claimed in claim 8, in which a portion including an overlapped portion between the battery body and the spacer is provided with the elastic body produced through an insert molding.

10. A thin battery as claimed in claim 8, in which the fixing portion is provided at both ends of said battery body.

11. A thin battery as claimed in claim 3, in which the other elastic body is formed with a fragile portion of which adhesive strength is lower than that of the other portion.

12. A thin battery as claimed in claim 11, in which the fragile portion is provided by a cut portion produced by cutting the other elastic body.

13. A thin battery as claimed in claim 11, in which the fragile portion is provided at least at a portion of a boundary surface between the elastic body or the other elastic body and the outer cover member and in which the adhesive strength of the fragile portion is lower than that of the other portion of the boundary surface where the fragile portion is not provided.

14. A thin battery as claimed in claim 13, in which the fragile portion is provided at the boundary surface that includes a boundary surface that includes an end that is placed at an outer side of the outer peripheral portion of the outer cover member.

15. A thin battery as claimed in claim 11, in which the other elastic body is provided by applying the outer peripheral portion of the outer cover member with an elastic resin through an insert molding, and in which the fragile portion is provided at a downstream portion of the elastic resin with respect to a resin inlet opening of the outer peripheral portion through which a material of the elastic resin is poured.

16. A thin battery as claimed in claim 11, in which a terminal drawn from a part of the outer peripheral portion of the outer cover member is further provided, and the fragile portion is formed at the outer peripheral portion other than the part.

17. A thin battery as claimed in claim 11, in which the fragile portion is provided at least at a part of a boundary surface between the other elastic body and the outer cover member, and the adhesive strength of the fragile portion is lower than a base material strength of the other elastic body.

18. A method of producing a thin battery, comprising:
- a step for producing a battery body that includes an electricity generating element hermetically installed in an outer cover member made of a laminated film including a resin layer, an outer peripheral portion of the outer cover member being sealed;
- a step for preparing a spacer with a fixing portion by which the battery body is fixed to a predetermined position;
- a step for setting the spacer in an insert molding die in such a manner that the spacer is stacked on an outer peripheral portion of the battery body; and
- a step for carrying out an inserting molding by filling a material of elastic resin into a range that is provided at least around the fixing portion at the outer peripheral portion and includes a mutually overlapped portion between the outer peripheral portion and the spacer thereby to form in the range an elastic resin portion,
- wherein the spacer is formed, at a portion to be connected to the elastic resin portion, with a reinforced portion having a surface that faces against a direction in which an external force is applied from a direction parallel to a main face of said battery body.

\* \* \* \* \*